United States Patent [19]

Lin

[11] Patent Number: 5,044,054

[45] Date of Patent: Sep. 3, 1991

[54] DRIVING HEAD HOLDER FOR TURRET MILLING MACHINE

[76] Inventor: Ming-Hong Lin, No. 23, Jenn Shing Rd., Tai Pyng Shiang, Taichung Shiann, Taiwan

[21] Appl. No.: 530,861

[22] Filed: May 31, 1990

[51] Int. Cl.⁵ .................... B23B 39/16; B23C 1/12
[52] U.S. Cl. ........................................ 29/39; 409/201
[58] Field of Search ............ 409/201, 204, 211, 212, 409/213, 216, 230; 29/39, 35.5, 47, 48.5 R, 48.5 A, 46

[56] References Cited

U.S. PATENT DOCUMENTS

| Re. 31,288 | 6/1983 | Matsuzaki et al. | 409/213 X |
|---|---|---|---|
| 2,286,821 | 6/1942 | Libby | 409/201 |
| 2,404,561 | 7/1946 | Bannow | 409/216 |
| 2,499,842 | 3/1950 | Armitage | 409/201 X |
| 2,930,291 | 3/1960 | Bannow et al. | 409/216 |
| 3,232,171 | 2/1966 | Hengehold | 409/211 |
| 3,460,435 | 8/1969 | Hucks et al. | 409/230 X |
| 3,577,828 | 5/1971 | Stickney | 409/216 X |

Primary Examiner—William Briggs
Attorney, Agent, or Firm—Browdy and Neimark

[57] ABSTRACT

A driving head holder capable of perfectly and effectively holding a driving head on a turret milling machine is provided. The holder includes a cantilevering coupling member having two side walls pivotably mounting therebetween a driving head holding member which includes a middle web having an intermediate hub member having a through hole, two side portions having two cross sectionally T-shaped annular grooves, and a curved peripheral portion integrally forming thereto the web and side portions.

4 Claims, 4 Drawing Sheets

DRIVING HEAD HOLDER FOR TURRET MILLING MACHINE

BACKGROUND OF THE INVENTION

The present invention relates to a turret milling machine, and more particularly to a driving head holder therefor.

The conventional driving head holder, as shown in FIGS. 1 & 2, for a turret milling machine includes a driving head holding member 1 having 3 through arcuate grooves 111 and a central through hole 112, a cantilevering coupling member 4 having two side walls 41, 42 respectively having large holes 411, 421 and small holes 412, 422, a bolt 12 penetrating through holes 411, 412 & 421 for pivotably mounting member 1 between side walls 41, 42 three bolts 11 respectively passing through holes 412, 422 and grooves 111 for fixing member 1 against side walls 41, 42, a worm rack 15 provided on holding member 1, and a worm 5 mounted on member 4 and meshing with rack 14 for adjusting the pivoting degree of member 1 with respect to member 4. Such driving head holder has the disadvantage that long bolts 11 cannot effectively securely fix member 1 against side walls 41, 42 or that member 1 relatively easily pivots with respect to member 4 during a working period of the milling machine.

In order to overcome the above shortcoming, it is proposed that the driving head holder, as shown in FIGS. 3 & 4, includes a driving head holding member 6 having two side wall 61, 62 with side wall 61 being provided with a worm rack meshing with worm 5, a cantilevering coupling member 7 having two side walls 73, 74, a large mounting bolt, and 8 small mounting bolts 14 respectively bolting side walls 61, 62 against side walls 73, 74. Although this latter holder overcome the disadvantage suffered by the former holder, it suffers from the disadvantages that the stiffness of holding member 6 is much smaller than that of holding member 1 and that worm 5 merely meshes with side wall 61 so that an asymmetrical situation easily occurs between side walls 61, 62 which results in that there is a vibrating phenomenon during the working period.

SUMMARY OF THE INVENTION

It is therefore an object of the present invention to provide a driving head holder capable of desirably fixing a driving head holding member on a cantilevering coupling member of a turret milling machine without the stiffness of the driving head holding member being lowered.

According to the present invention, a driving head holder for a turret milling machine includes a cantilever coupling member having two side walls, and a shaft member penetrating through the side walls and the holding member for pivotally mounting the holding member between the side walls, in which the holding member includes a middle web having an intermediate hub member having a through hole passing therethrough the shaft member, two side portions respectively having two cross sectionally T-shaped annular grooves each of which is capable of receiving and retaining therein a headed portion of a screw protruding beyond one of the side walls to threadedly engage with a nut, and a curved peripheral portion integrally forming thereto the web and the side portions.

The present invention may best be understood through the following description with reference to the accompanying drawings, in which:

DETAILED DESCRIPTION OF THE PREFERRED EMBODIMENT

Figure 1:
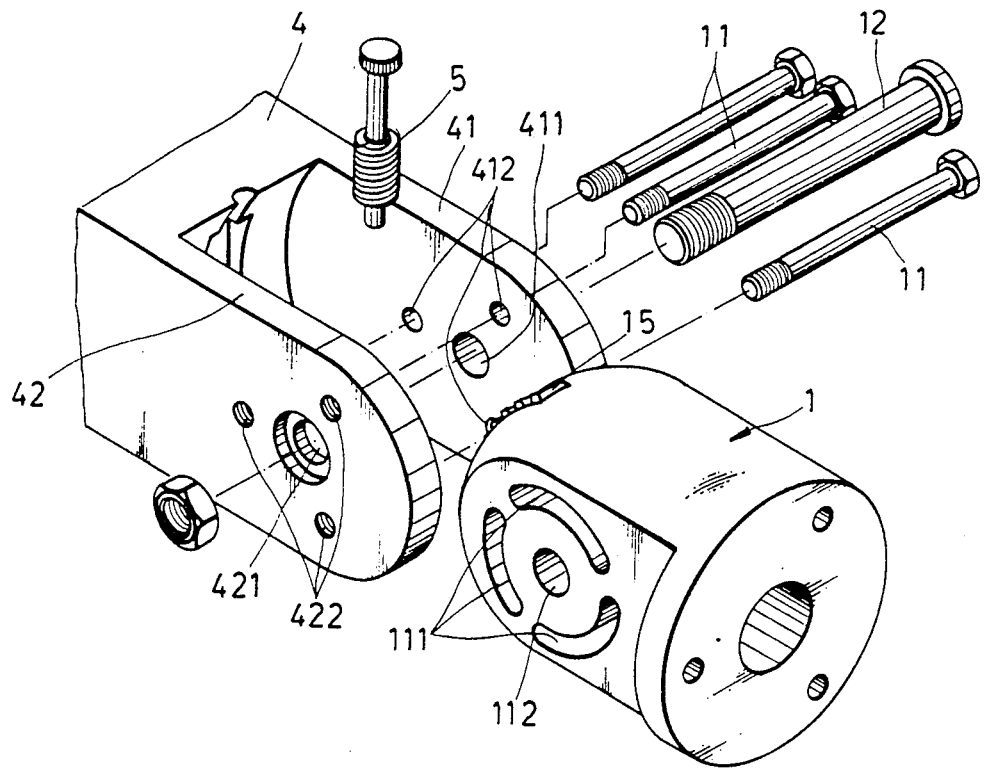
FIG. 1 is an exploded view showing a driving head holder for a turret milling machine according to the prior art.
Figure 2:
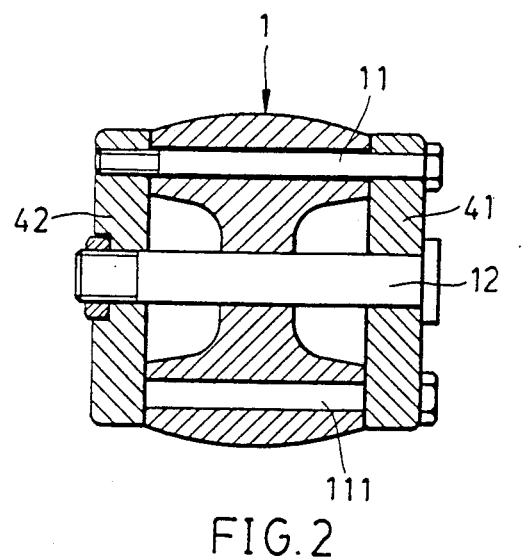
FIG. 2 is a schematically sectional view showing driving head holder in FIG. 1.
Figure 3:
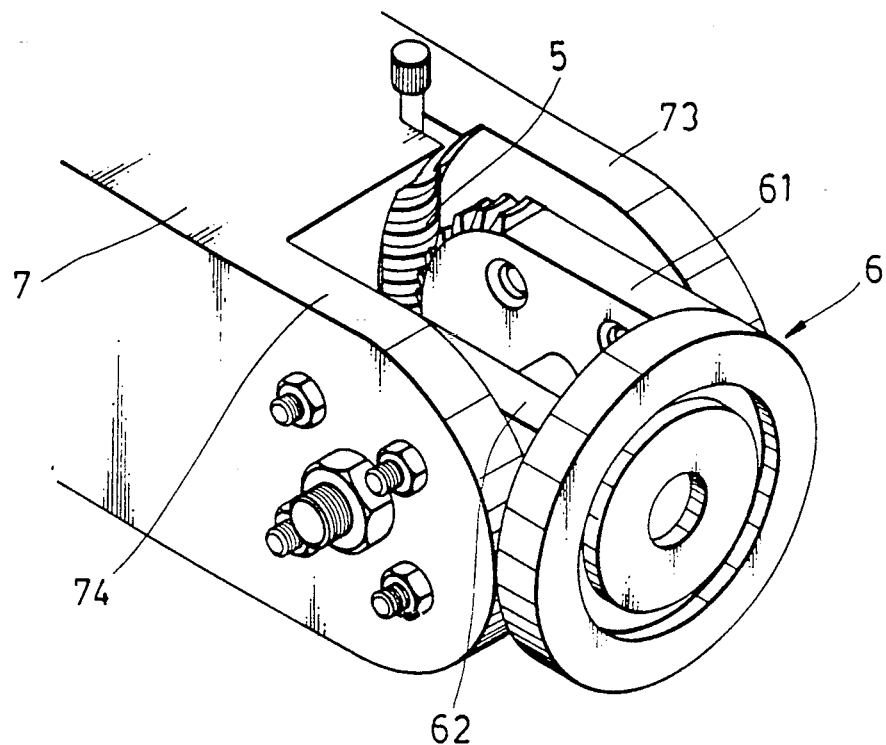
FIG. 3 is a perspective view showing another driving head holder for a turret milling machine according to the prior art.
Figure 4:
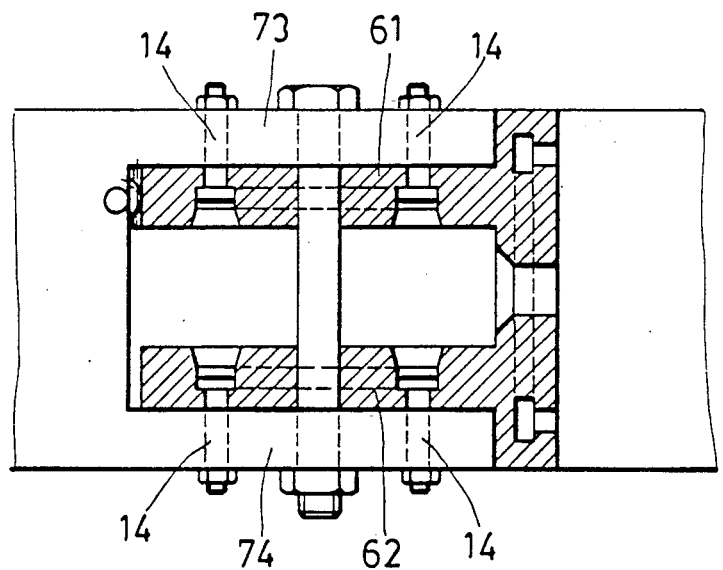
FIG. 4 is a schematically view showing the engagement of a driving head holding member and a cantilevering coupling member of a driving head holder in FIG. 3.
Figure 5:
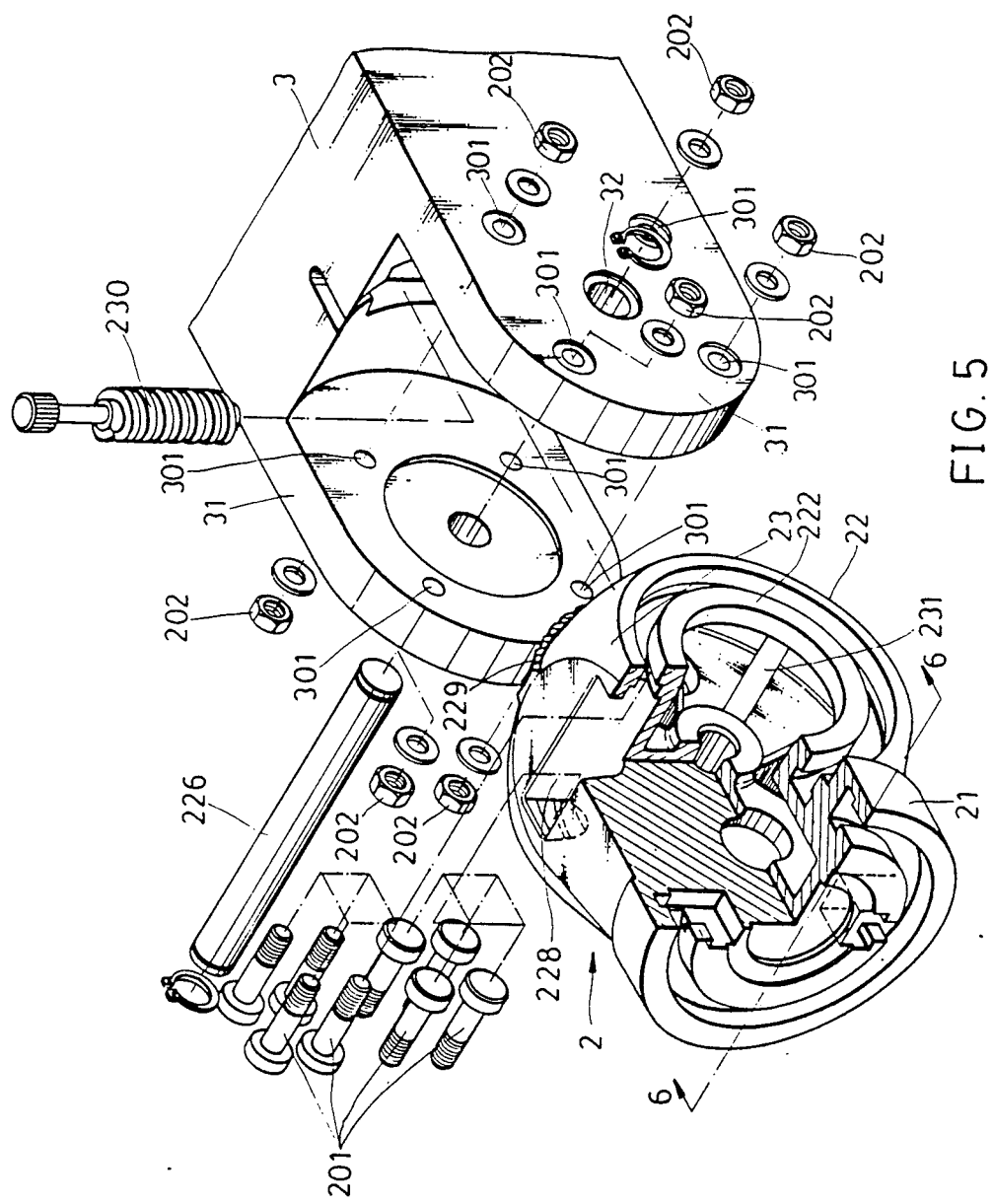
FIG. 5 is an exploded view showing a preferred embodiment of driving head holder for a turret milling machine according to the present invention.
Figure 8:
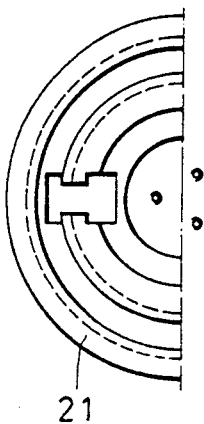
FIG. 8 is a half front view showing a driving head holding member of a driving head holder in FIG. 5.
Figure 6:
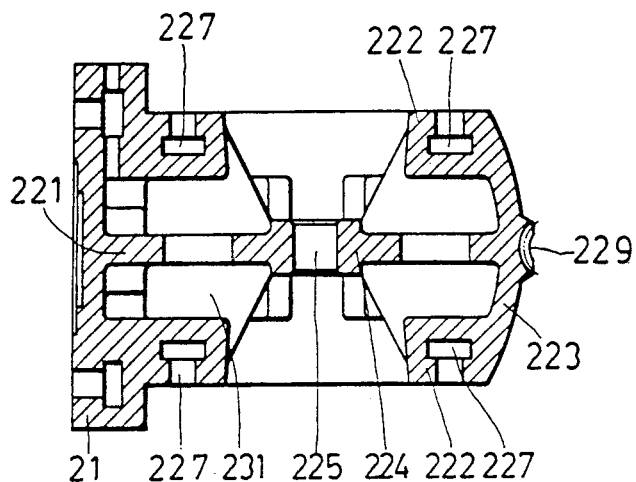
FIG. 6 is a sectional view taken along line 6—6 in FIG. 5.
Figure 7:
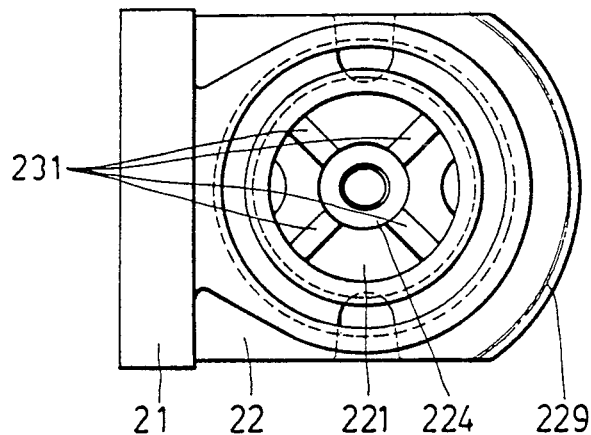
FIG. 7 is a side view showing a driving head holding member of a driving head holder in FIG. 5.
Figure 9:
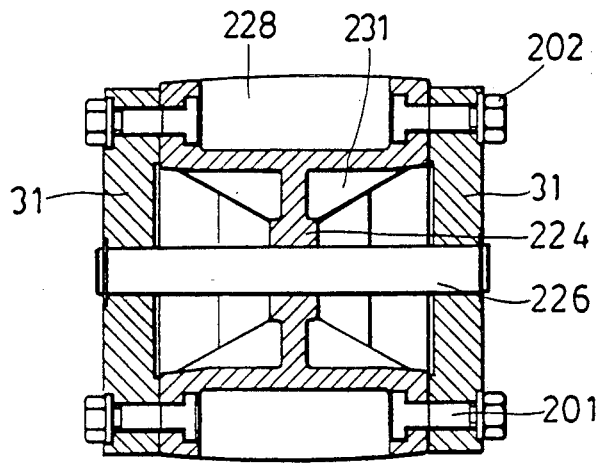
FIG. 9 is a schematically sectional view showing the engagement of a driving head holding member and a cantilevering coupling member of a driving head holder in FIG. 5.

Referring now to FIGS. 5-8, a driving head holder for a turret milling machine according to the present invention includes a cantilevering coupling member 3 cantilevered from the milling machine and having two side walls 31 respectively having large through holes 32 and small through holes 301, a driving head holding member 2 mounted between side walls 31 and adapted to connect thereto a driving head for the turret milling machine, and a shaft member 226 having two ends thereof retained in side walls 31 respectively by two retainers and penetrating through side walls 31 and holding member 2 for pivotably mounting holding member 2 between side walls 31.

Driving head holding member 2 includes a driving head mounting portion 21 being the same with the prior art and a coupling member mounting portion 22 which includes a middle web 221 having an intermediate hub member 224 having a central through hole 225 passing therethrough shaft member 226 passing through large holes 32, two side portions 222 respectively corresponding to side walls 31 and respectively having two cross sectionally T-shaped annular grooves 227 each of which is capable of receiving and retaining therein a headed portion of screw 201 passing through one of small holes 301 to threadedly engage with one of nut 202, a curved peripheral portion 223 integrally forming thereto web 221 and side portions 222 and having a top portion and a bottom portion each of which includes an opening 228 communicating with annular grooves 227 for inserting therefrom screw 201 into the relevant groove 227 spacedly receiving therein headed portions of 4 screws 201 in the shown embodiment, a worm rack 229 provided on curved peripheral portion 223, a worm 230 mounted on coupling member 3 and meshing with worm rack 229, and a plurality of reinforcing ribs 231 connecting together hub member 224 and side portions 222.

It is to be noticed that numerous modifications can be made to the above described embodiment without departing the spirit of the present invention. For example, holding member 2 can be a composite member instead of an integral one and meshing gears can replace worm rack 229 and worm 230.

What is claimed is:

1. A driving head holder for a turret milling machine comprising a cantilevering coupling member cantilevered from said milling machine and having two side walls, a driving head holding member mounted between said side walls and adapted to connect thereto a driving head for said milling machine, and a shaft member penetrating through said side walls and said holding member for pivotally mounting said holding member between said side walls, characterized in that said holding member includes:

- a middle web having an intermediate hub member having a through hole for passing through said shaft member;
- two side portions respectively corresponding to said side walls and respectively having two cross sectionally T-shaped annular grooves opening outwardly to face said side wall each groove being capable of receiving and retaining therein a headed portion of a screw protruding beyond one of said side walls to threadedly engage with a nut; and
- a curved peripheral portion integral to and attaching said web and said side portions.

2. A driving head holder according to claim 1, further comprising a plurality of reinforcing ribs connecting together said hub member of said web and said side portions.

3. A driving head holder according to claim 1, wherein said peripheral portion includes a top portion and bottom portion each of which includes an opening communicating with said annular grooves for inserting therefrom said screw into one of said annular grooves.

4. A driving head holder according to claim 1, further comprising two retainers respectively retaining two ends of said shaft member in said side walls.

* * * * *